(12) United States Patent
Goyal et al.

(10) Patent No.: US 8,787,547 B2
(45) Date of Patent: Jul. 22, 2014

(54) SELECTIVE AUDIO COMBINATION FOR A CONFERENCE

(75) Inventors: Ashish Goyal, Bangalore (IN); Hrishikesh G. Kulkarni, Bangalore (IN); Hitesh Chouhan, Bangalore (IN); Sampath Kumar Srinivas, Bangalore (IN); Vivek Wamorkar, Bangalore (IN); Raghuram Belur, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 574 days.

(21) Appl. No.: 12/765,944

(22) Filed: Apr. 23, 2010

(65) Prior Publication Data

US 2011/0261150 A1   Oct. 27, 2011

(51) Int. Cl.
*H04M 3/42* (2006.01)
*H04L 12/16* (2006.01)
*H04N 7/14* (2006.01)

(52) U.S. Cl.
USPC ............ 379/202.01; 370/269; 348/14.09

(58) Field of Classification Search
None
See application file for complete search history.

(56) References Cited

U.S. PATENT DOCUMENTS

| | | | |
|---|---|---|---|
| 6,404,745 B1 | 6/2002 | O'Neil et al. | |
| 2002/0126626 A1 | 9/2002 | Singh et al. | |
| 2005/0062843 A1* | 3/2005 | Bowers et al. | 348/14.08 |
| 2005/0135280 A1* | 6/2005 | Lam | 370/260 |
| 2007/0206089 A1* | 9/2007 | Eshkoli et al. | 348/14.02 |
| 2008/0165707 A1* | 7/2008 | Baird et al. | 370/260 |
| 2008/0273079 A1* | 11/2008 | Campbell et al. | 348/14.08 |
| 2008/0310398 A1* | 12/2008 | Jain et al. | 370/352 |
| 2009/0172147 A1* | 7/2009 | Cline et al. | 709/224 |
| 2010/0194847 A1* | 8/2010 | Halavy | 348/14.09 |

OTHER PUBLICATIONS

U.S. Appl. No. 61/321,868, entitled "Multi-Participant Conference", filed Apr. 7, 2010, inventors Roberto Garcia Jr., Berkat S. Tung, Nirav Patel, Joe S. Abuan, and Hyeonkuk Jeong, 111 pages.

* cited by examiner

*Primary Examiner* — Simon Sing
*Assistant Examiner* — Jeffrey Lytle
(74) *Attorney, Agent, or Firm* — Meyertons Hood Kivlin Kowert & Goetzel, P.C.; Jeffrey C. Hood; Joel L Stevens

(57) ABSTRACT

Selective audio combination for a conference. The conference may be initiated between a plurality of participants at respective participant locations. The conference may be performed using a plurality of conferencing endpoints at each of the participant locations. Audio may be received from each of the plurality of conferencing endpoints. Audio level information may also be received from each of the plurality of conferencing endpoints. The audio may be combined from a plural subset of the plurality of conferencing endpoints to produce conference audio. The plural subset is less than all of the plurality of conferencing endpoints. The audio may be combined based on the audio level information. The conference audio may be provided to the plurality of conferencing endpoints.

13 Claims, 4 Drawing Sheets

SELECTIVE AUDIO COMBINATION FOR A CONFERENCE

FIELD OF THE INVENTION

The present invention relates generally to conferencing and, more specifically, to a method for selectively combining audio for a conference.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to another (remote) participant. Each videoconferencing system may also include a display and speaker(s) to reproduce video and audio received from one or more remote participants. Each videoconferencing system may also be coupled to (or comprise) a computer system to allow additional functionality into the videoconference. For example, additional functionality may include data conferencing (including displaying and/or modifying a document for both participants during the conference).

Similarly, audioconferencing (e.g., teleconferencing) may allow two or more participants at remote locations to communicate using audio. For example, a speakerphone may be placed in a conference room at one location, thereby allowing any users in the conference room to participate in the audioconference with another set of user(s) (e.g., in another conference room with a speakerphone).

In large conferencing, significant resources may be required to perform decoding and/or mixing of audio and video of the conference. Accordingly, more efficient processes for conferencing are desired.

SUMMARY OF THE INVENTION

Various embodiments are presented of a system and method for selectively combining audio for a conference.

A conference may be initiated between a plurality of participants at respective participant locations. The conference may be performed using a plurality of endpoints (e.g., videoconferencing endpoints) at each of the participant locations. Thus, each endpoint may be used for communication by each participant at each participant location to participate in the conference.

Audio may be received from each of the plurality of endpoints. Additionally, audio level information may be received from each of the plurality of endpoints. For example, the audio level information may be included in headers of conference information. In one specific embodiment, the audio level information may be received as a header of the received audio, e.g., a real-time transport protocol (RTP) header.

The audio from a plural subset of the plurality of endpoints may be decoded and/or combined to produce conference audio. The plural subset is less than all of the plurality of endpoints. The audio from the plural subset is combined based on the audio level information. Note that without the audio level indication the conference would be required to decode each audio stream to make such a determination which is computationally intensive.

In some embodiments, the method may analyze the audio level information from each of the plurality of endpoints to determine audio from the plural subset of the endpoints which exceed a predetermined audio threshold.

Alternatively, or additionally, the audio level information from each of the plurality of endpoints may be compared to determine audio from n conferencing endpoints which have the highest audio level. Accordingly, combining the audio from the plural subset of the plurality of endpoints may only include combining the audio from the n endpoints. n may be predetermined or may be determined dynamically based on the audio level information during the conference.

The conference audio may be provided to the plurality of videoconferencing endpoints. The reception of audio and audio level information, the combination of the determined audio, and the provision of the conference audio may be performed a plurality of times in a dynamic fashion during the conference.

BRIEF DESCRIPTION OF THE DRAWINGS

A better understanding of the present invention may be obtained when the following detailed description is considered in conjunction with the following drawings, in which.

Figure 1:
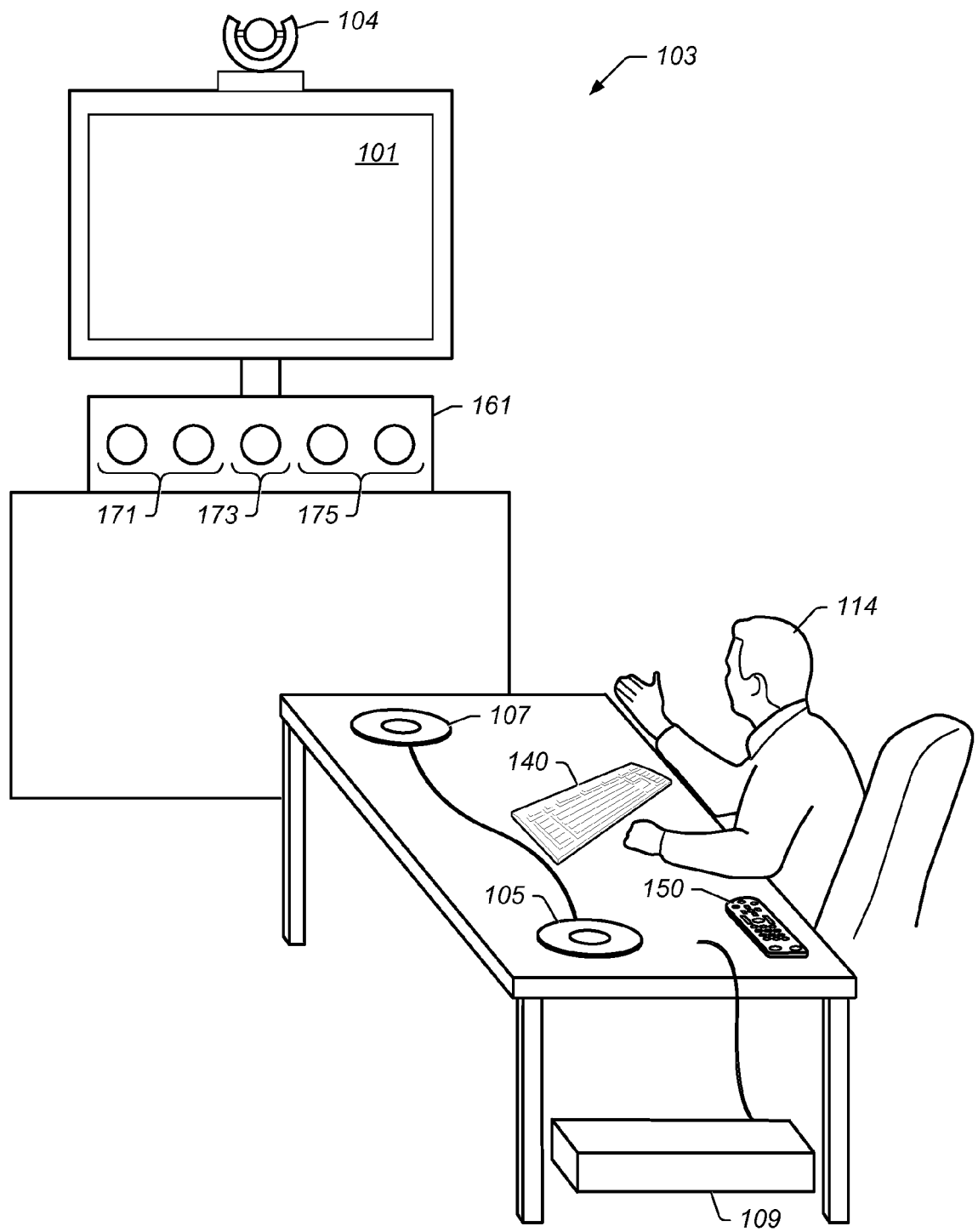
FIGS. 1 and 2 illustrate exemplary videoconferencing system participant locations, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note that the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

Figure 2:

FIGS. 1 and 2—Exemplary Participant Locations

FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference.

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on a floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

Note that the videoconferencing system shown in FIGS. 1 and 2 may be modified to be an audioconferencing system. The audioconferencing system, for example, may simply include speakerphones 105/107, although additional components may also be present. Additionally, note that any reference to a "conferencing system" or "conferencing systems" may refer to videoconferencing systems or audioconferencing systems (e.g., teleconferencing systems).

Figure 3A:
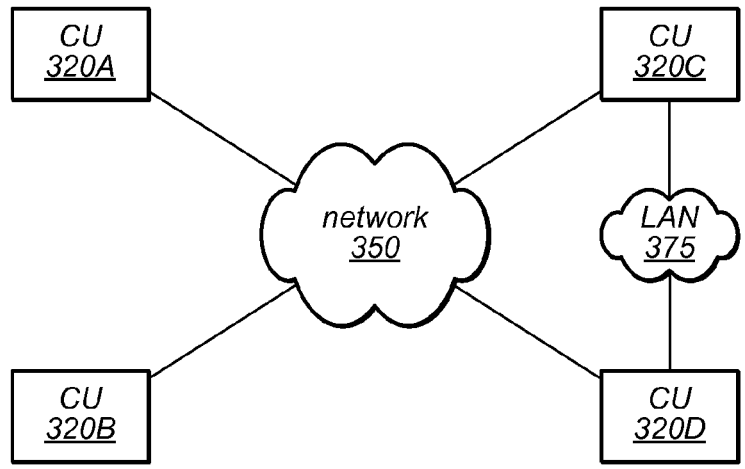
FIGS. 3A and 3B illustrate exemplary conferencing systems coupled in different configurations, according to some embodiments.
Figure 3B:
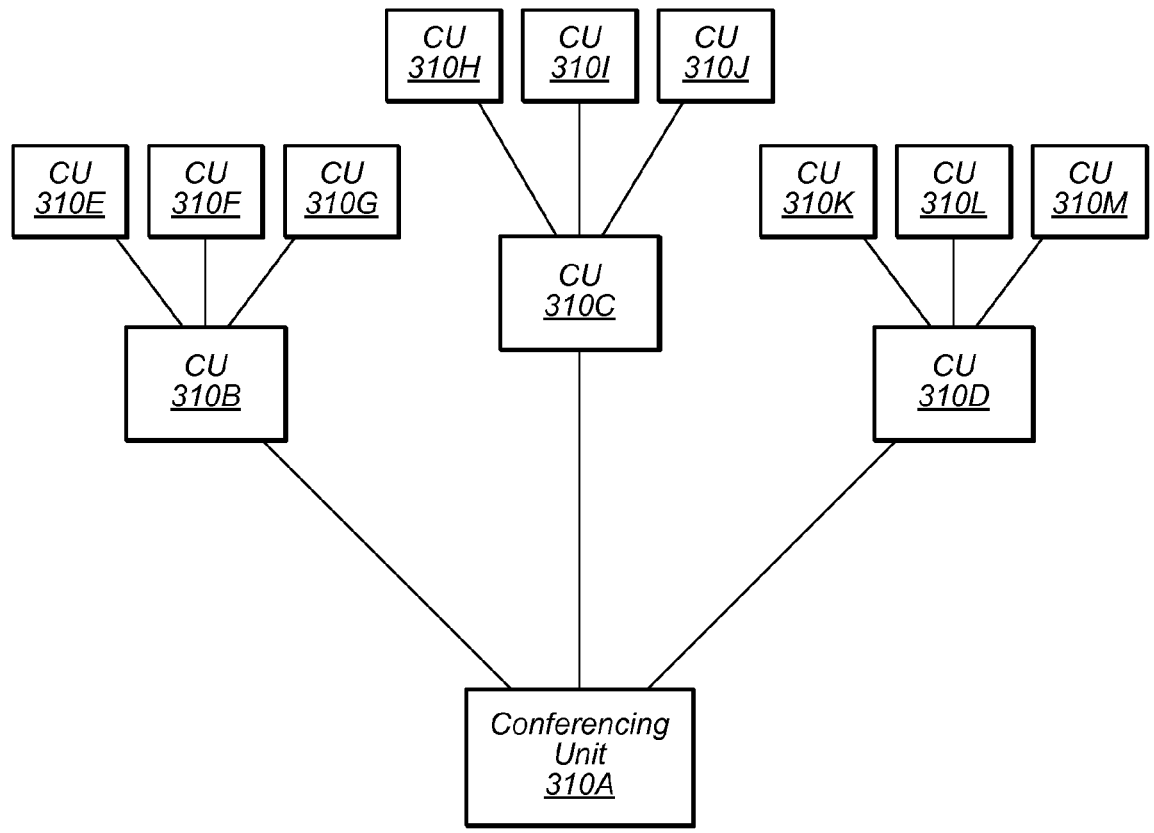

FIGS. 3A and 3B—Coupled Conferencing Systems

FIGS. 3A and 3B illustrate different configurations of conferencing systems. The conferencing systems may be operable to perform the methods described herein. As shown in FIG. 3A, conferencing systems (CUs) 320A-D (e.g., videoconferencing systems 103 described above) may be connected via network 350 (e.g., a wide area network such as the Internet) and CU 320C and 320D may be coupled over a local area network (LAN) 375. The networks may be any type of network (e.g., wired or wireless) as desired.

FIG. 3B illustrates a relationship view of conferencing systems 310A-310M. As shown, conferencing system 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

Figure 4:
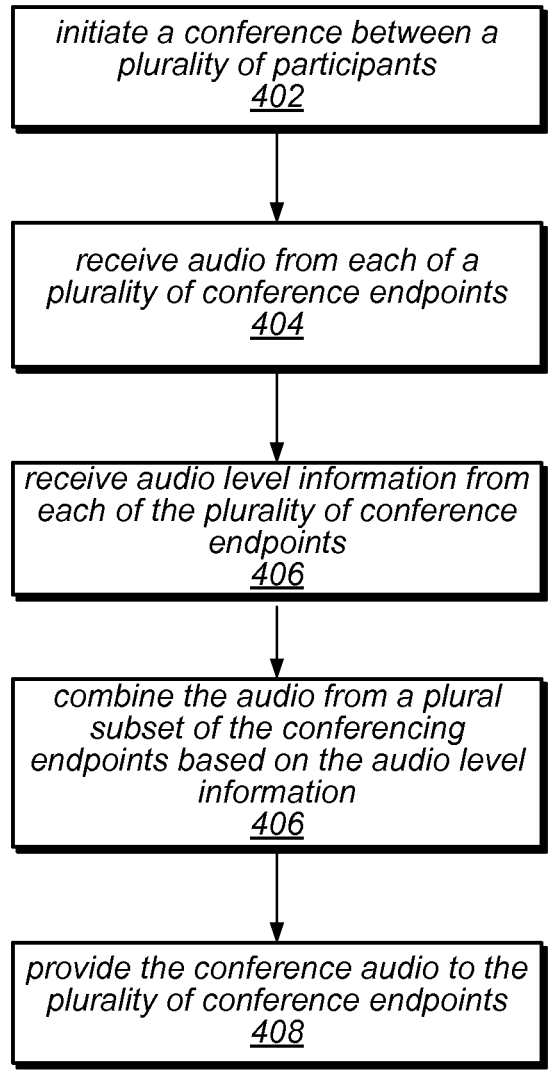
FIG. 4 is a flowchart diagram illustrating an exemplary method for selectively combining audio for a conference, according to an embodiment.

FIG. 4—Selectively Combining Audio for a Conference

FIG. 4 illustrates a method for selectively combining audio for a conference. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, a conference may be initiated between a plurality of participants at respective participant locations. More specifically, the conference may be initiated between a first participant at a first location and a second participant at a second location, although further participants and locations are envisioned. The conference may be performed using a plurality of videoconferencing endpoints at each of the participant locations. Thus, each participant location has a respective conferencing unit, such as those described above regarding FIGS. 1 and 2. Each conferencing unit may be used by each participant to perform the conference, e.g., by providing and receiving conference communication for each participant.

As indicated above, the conference may be an audioconference, such as a teleconference, where at least a subset or all of the participants are called using telephone numbers. Alternatively, the audioconference could be performed over a network, e.g., the Internet, using VoIP. Similarly, the conference may be a videoconference, and the conference may be established according to any of a variety of methods, e.g., the one described in patent application Ser. No. 11/252,238, which was incorporated by reference above. The videoconference or audioconference may utilize an instant messaging service or videoconferencing service over the Internet, as desired.

In 404, audio may be received from each of the plurality of videoconferencing endpoints, e.g., during the conference. Additionally, in 406, audio level information may be received from each of the plurality of videoconferencing endpoints. For example, in one embodiment, the audio may be provided in an audio stream comprising one or more audio packets. The stream may also include video, e.g., the stream may be may be an audiovisual stream. In some embodiments, the packets of the stream may be encoded according to the real-time transport protocol (RTP).

The audio and audio level information may be received by one or more multipoint control units NCUs, which may be a part of or separate from a conferencing unit. For example, in one embodiment, the MCU may be a bridge MCU, e.g., which does not have a camera and speakerphone. Thus, in some embodiments, all conferencing units may provide their conferencing signals (e.g., the audio, video, and/or audio level information) to one or more MCUs and then the MCU may provide mixed (or otherwise modified) conferencing signals back to each of the conferencing signals. However, in some embodiments, one of the conferencing units may act as an MCU. Thus, all other conferencing units may provide their conferencing signals to the conferencing unit including the MCU. Additionally, in one embodiment, the conferencing unit may provide its own local conferencing signals (including the audio and/or audio level information) to the MCU software executing on the conferencing unit. Thus, the reception of audio and/or audio level information may be performed.

In various embodiments, the audio level information may be sent with the audio or separately, as desired. In one embodiment, the audio level information may be included in headers packets, e.g., of the stream (or other conference information). For example, in one embodiment, the audio level information may be received in header(s) of packet(s) of the received audio, e.g., in an RTP header. Other methods of sending the audio level information are envisioned. In further embodiments, the audio level information may be determined upon reception and the audio level information may not be sent with the audio, although this may not be the typical case.

In 406, the audio from a plural subset of the plurality of videoconferencing endpoints may be decoded and/or combined to produce conference audio. In some embodiments, the plural subset is less than all of the plurality of videoconferencing endpoints. In other words, the number of audio streams that are decoded and/or combined are more than one but less than the total number of received audio streams. The audio that is decoded and/or combined may be determined based on the audio level information.

More specifically, the determination of the audio to be decoded and/or combined may be chosen via a variety of possible methods. In some embodiments, the method may analyze the audio level information from each of the plurality of endpoints to determine audio from the plural subset of the endpoints which exceed a predetermined audio threshold. Thus, only audio that is above a certain threshold may be decoded and/or combined to produce the videoconferencing audio that is provided to all of the plurality of conferencing units (as described in 408 below). Accordingly, the method may dynamically determine which audio should be mixed, e.g., in a periodic fashion. Thus, for a first time period or number of packets, the audio may be decoded and/or mixed from a varying number of conferencing units, e.g., according to the threshold above. In further embodiments, the threshold may vary, e.g., according to the maximum, minimum, average, etc. audio levels of the received audio.

Alternatively, or additionally, the audio level information from each of the plurality of endpoints may be compared to determine audio from n conferencing endpoints which have the highest audio level. Accordingly, combining the audio from the plural subset of the plurality of videoconferencing endpoints may only include combining the audio from the n videoconferencing endpoints. n may be predetermined or may be determined dynamically based on the audio level information during the conference. While the above described embodiment refers to a static number of conferencing units, the audio of the conferencing units may be selected by selecting a top m percentage of the conferencing units. For example, only the audio from the conferencing units that are the top 25% may be mixed. Following this example, where there are 8 conferencing units in the conference, only audio from the 2 conferencing units with the highest audio levels may be decoded and/or combined.

In further embodiments, the audio level information for each conferencing unit may be compared to determine an appropriate number of audio streams to decode and/or mix. For example, the method may determine where there is a large discrepancy between audio levels among the conferencing unit and only mix the audio for levels above that discrepancy. As a more specific example, in a conference with 10 participants, at a given time, 3 of the participants may be talking and the other 7 may be silent. In this situation, the method may determine that there is a large difference between the audio level of the $3^{rd}$ and $4^{th}$ highest levels, and may only decode and/or mix only the top 3 audio streams. In some embodiments, such an embodiment may have an upper threshold on the total number of audio streams to decode and/or mix, e.g., to conserver system resources and/or processing.

Upon determining which audio streams to decode and/or mix, the method may decode each determined audio stream (e.g., if it was encoded originally) and combine the determined audio streams to form conference audio, for provision back to the conferencing units. In some embodiments, the audio stream and video stream may be decoded, e.g., where they are received in a combined fashion. Additionally, the method may encode the combined audio (e.g., with video from each of the conferencing units, or at least a plurality of the conferencing units) to form conferencing signals.

In some embodiments, the conference audio may be generated/encoded differently for each of the participants which are not being combined. However, in some embodiments, conference software may get some or all of the participants to use a common audio codec—so that the same encoded stream can be shared across multiple participants thereby saving number of encoded streams that need to be generated.

Thus, where the conference is a videoconference, the videoconferencing signals may include video from all or a subset of the videoconferencing units, but may include the audio for only the determined conferencing units. Thus, the combined conferencing signals may not include the audio from all of the conferencing units, but only a plural subset of the conferencing units, as determined above.

In 408, the conference audio may be provided to the plurality of conferencing endpoints. As indicated above, the audio may be provided with video signals (e.g., in a videoconference) and/or may be encoded, as desired. The conference signals (e.g., the conference audio) may be provided to the conferencing units locally and/or over a network, as desired. For example, where the audio is received from an external MCU, the MCU may provide the conferencing signals to all of the participating conferencing units. Alternatively, where the MCU is combined with one of the conferencing units, the MCU may provide the conferencing signals to all the remote conferencing units (e.g., over a network) and may locally provide conferencing signals to the conferencing unit on which the MCU is executing.

The reception of audio and audio level information (404), the combination of the determined audio (406), and the provision of the conference audio/signals (408) may be performed a plurality of times in a dynamic fashion during the conference. For example, the method may be performed upon each packet reception, each time audio level information is received, every t numbers of packets, every t seconds or milliseconds, etc. In further embodiments, the audio may be mixed according to a determination until audio level information changes, significantly, e.g., the audio levels ceasing to exceed a threshold, when the n conference units change, etc. Thus, the method may be performed a plurality of times throughout the conference.

As already indicated, the method may be performed by various endpoints or conferencing units, but may also be performed by transceivers, MCUs, transcoders, or any other intervening equipment between endpoints of the conference, as desired.

ADVANTAGES

The method described above has substantial advantages over prior methods. Typically, in prior conferencing systems, every audio stream was decoded and mixed to produce the videoconferencing audio. However, using the methods described herein, audio streams with little or no actual sound may be disregarded, allowing for a more efficient process. For example, an MCU, which may be used to perform a large conference (e.g., involving 16 or more independent audio streams), will not have to decode and mix all of the audio, thereby saving system resources, e.g., for other tasks. Where a static (or bounded) number of audio streams are decoded and mixed, the required audio processing scales virtually infinitely, providing a large benefit over prior solutions. Furthermore, the described method may also limit the number of required decoders.

Additionally, the above technique can be used in reducing the complexity of a mixer by reducing the number of unique streams to be generated. Consider a scenario where number of participants chosen to be mixed (n) is 3 and total number of participants in conference is 6 (A, B, C, D, E, F). Considering A, B, C to be the three participants to be mixed—in one embodiment of the method above—only a single stream which is a mix of A, B and C is adequate for the participants not being mixed D, E and F. For a larger conference—say 16 way or 100 way—the savings to mixer are much more significant.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer accessible non-transitory memory medium storing program instructions for performing a conference, wherein the program instructions are executable by a processor of a multipoint control unit (MCU) to implement:

hosting a conference between a plurality of participants at respective participant locations, wherein the conference is performed using a plurality of endpoints at the respective participant locations;

receiving audio from each of the plurality of endpoints;

receiving audio level information from each of the plurality of endpoints;

combining the audio from a plural subset of the plurality of endpoints to produce conference audio, wherein the audio from the plural subset is combined based on the audio level information, wherein the plural subset is less than all of the plurality of conferencing endpoints, wherein said combining comprises analyzing the audio level information from each of the plurality of endpoints to determine audio from a designated number (n) of videoconferencing endpoints which have highest audio levels, wherein the value of n is determined dynamically based on said analyzing, and wherein said combining the audio from the plural subset of the plurality of endpoints comprises combining only the audio from the n endpoints; and providing the conference audio to the plurality of endpoints.

2. The non-transitory memory medium of claim 1, wherein the audio level information is received as a header associated with the audio stream.

3. The non-transitory memory medium of claim 1, wherein the level information is received as out of band signaling.

4. The non-transitory memory medium of claim 1, wherein the program instructions are further executable to implement:

allocating a decoder for each of the plural subset of the plurality of conferencing endpoints based on the level information; and decoding the audio from the plural subset of the plurality of endpoints based on the audio level information.

5. The non-transitory memory medium of claim 1, wherein said receiving, said combining, and said providing are performed a plurality of times in a dynamic fashion during the conference.

6. The computer accessible non-transitory memory medium of claim 1, wherein the MCU is comprised in an endpoint in the conference.

7. A method for performing a conference, comprising:

a multipoint control unit (MCU) hosting a conference between a plurality of participants at respective participant locations, wherein the conference is performed using a plurality of endpoints at the respective participant locations;

the MCU receiving audio from each of the plurality of videoconferencing endpoints;

the MCU receiving audio level information from each of the plurality of endpoints;

the MCU combining the audio from a plural subset of the plurality of endpoints to produce conference audio, wherein the audio from the plural subset is combined based on the audio level information, wherein the plural subset is less than all of the plurality of conferencing endpoints, wherein said combining comprises analyzing the audio level information from each of the plurality of endpoints to determine audio from a designated number (n) of videoconferencing endpoints which have highest audio levels, wherein the value of n is determined dynamically based on said analyzing, and wherein said combining the audio from the plural subset of the plurality of endpoints comprises combining only the audio from the n endpoints; and the MCU providing the conference audio to the plurality of videoconferencing endpoints.

8. The method of claim 7, wherein the audio level information is received as a header of the audio.

9. The method of claim 7, wherein said receiving, said combining, and said providing are performed a plurality of times in a dynamic fashion during the conference.

10. The method of claim 7, wherein the MCU is comprised in an endpoint in the conference.

11. A multi-point control unit (MCU), comprising:

a processor;

one or more inputs coupled to the processor;

one or more decoders coupled to the processor;

one or more outputs coupled to the processor;

one or more encoders coupled to the processor; and a memory medium coupled to the processor, wherein the memory medium stores program instructions for performing a videoconference, wherein the program instructions are executable by the processor to implement:

hosting a conference between a plurality of participants at respective participant locations, wherein the conference is performed using a plurality of endpoints at the respective participant locations;

receiving encoded audio from each of the plurality of endpoints via the one or more inputs;

receiving audio level information from each of the plurality of endpoints;

decoding the encoded audio from a plural subset of the plurality of endpoints using the one or more decoders to produce decoded audio, wherein the audio from the plural subset is decoded based on the audio level information, and wherein the plural subset is less than all of the plurality of endpoints, said decoding comprising analyzing the audio level information from each of the plurality of endpoints to determine audio from a designated number (n) of videoconferencing endpoints which have highest audio levels, wherein the value of n is determined dynamically based on said analyzing, and wherein said combining the audio from the plural subset of the plurality of endpoints comprises combining only the audio from the n endpoints;

encoding the decoded audio using the one or more encoders to produce conference audio; and providing the conference audio to the plurality of endpoints via the one or more outputs.

12. The MCU of claim 11, wherein said receiving, said decoding, said encoding, and said providing are performed a plurality of times in a dynamic fashion during the conference.

13. The MCU of claim 11, wherein the MCU is comprised in an endpoint in the conference.

* * * * *